Dec. 26, 1939.        H. BUCHANAN        2,184,631
BUMPER GUARD STRUCTURE
Filed Dec. 16, 1938        2 Sheets-Sheet 2
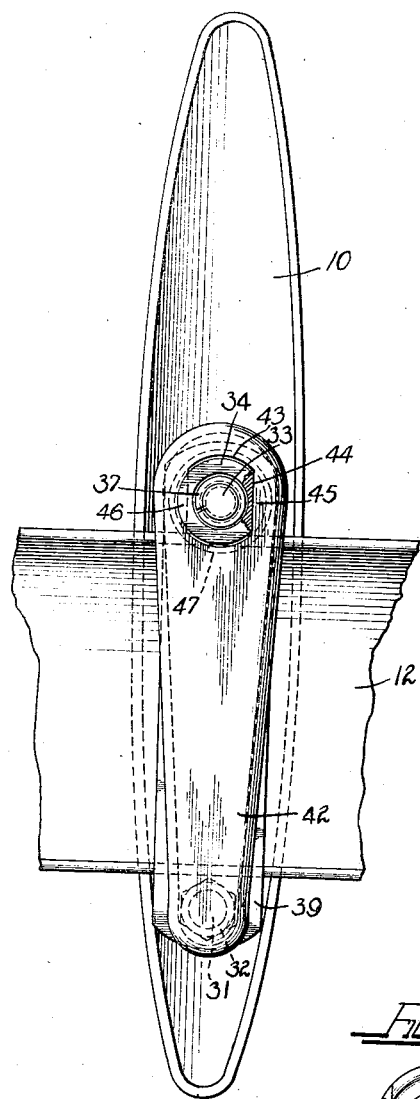
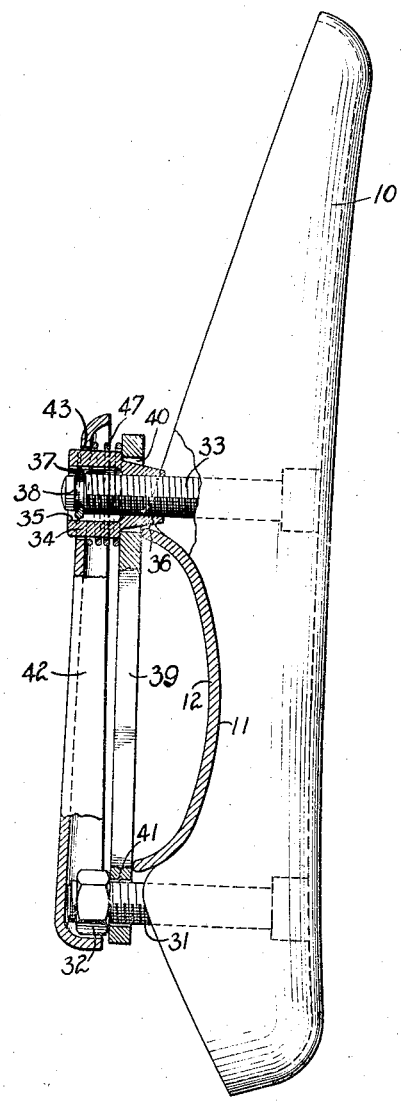
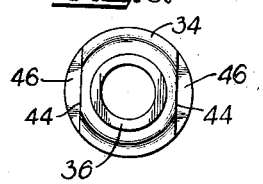
Inventor
HUGH BUCHANAN Patented Dec. 26, 1939

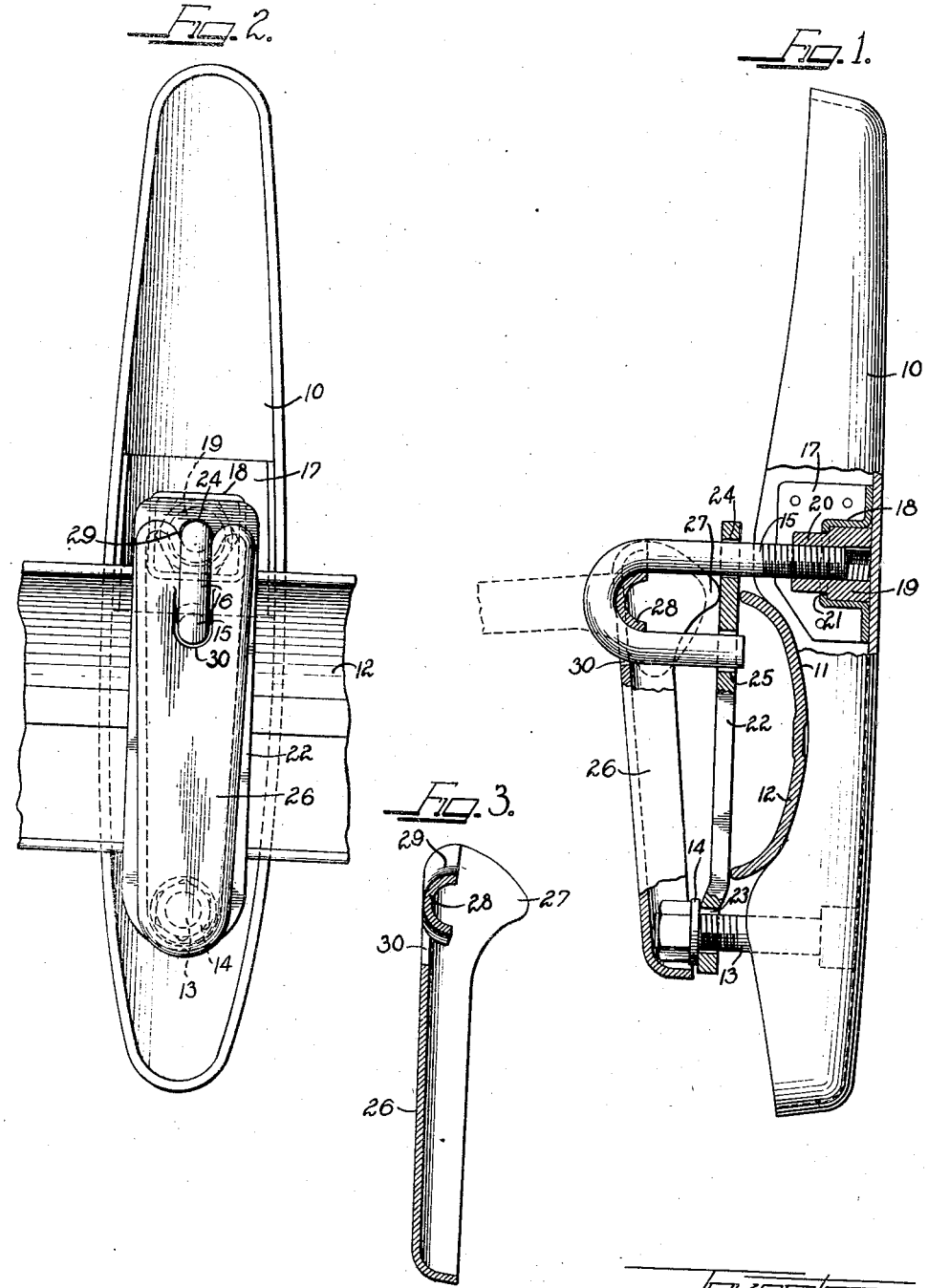

2,184,631

UNITED STATES PATENT OFFICE 2,184,631

BUMPER GUARD STRUCTURE

Hugh Buchanan, Detroit, Mich., assignor to Houdaille-Hershey Corporation, Detroit, Mich., a corporation of Michigan Application December 16, 1938, Serial No. 246,007

13 Claims. (Cl. 293—55)

This invention relates to guard structures for mounting on the bumper bars of an automotive vehicle to guard against overlapping or interlocking of the bumper bars with the bumper bars of another vehicle. It is particularly desirable to place a guard structure of this type at the center of the front bumper to protect the radiator and radiator grille against impact by bumpers of other vehicles. At times it may be necessary to crank the vehicle engine and the center guard which usually extends a considerable distance above the bumper bar may interfere with cranking. It is therefore the important object of this invention to provide a center guard structure with means requiring no tools but which may be readily operated to unclamp or release the guard sufficiently so that it may be slid to one side on the bumper guard for convenient access for cranking of the vehicle.

My improved construction and arrangement is shown on the drawings, in which drawings:

Figure 1 is a side elevation, partly in section, of a guard structure mounted on a bumper body;

Figure 2 is a rear elevation;

Figure 3 is a longitudinal section of the cam lever;

Figure 4 is a view like Figure 1, showing a modified arrangement;

Figure 5 is a rear elevation of the structure of Figure 4; and

Figure 6 is an end elevation of the clamping nut.

Referring to Figures 1 to 3, the guard body 10 is of channel shape and the rear portions of the side walls thereof are recessed as indicated at 11 to receive the bumper bar 12 and to fit the front convex curvature of the bar, the recesses being located so that the guard body will extend a distance down below the bumper bar and will extend a considerable distance above the bar so that when this guard structure is mounted at the center of a front bumper bar, the upper end of the guard body will afford protection against impact of bumpers of other cars with the vehicle radiator or the grille structure in front of the radiator.

A stud 13 extends outwardly on the guard body and is rigidly secured at its inner ends to the front wall of the body as by welding, the outer end of the stud being threaded to receive a nut 14.

Above the level of the bumper bar 11, securing structure is provided comprising a bolt 15 whose outer portion is reversely bent to form a hook 16. The end of the long leg of the bolt structure has threaded engagement with the guard body. As shown, a channel plate 17 is secured within the guard body, as by welding of the sides of the plate against the side walls of the guard body. The bottom or web portion of the channel plate is deflected forwardly to provide a housing 18 for a nut 19 to accurately hold the nut and prevent it from turning. The nut has a forward extension or head 20 which, like the nut, may be threaded, and which projects through the opening 21 in the front wall of the housing forming deflection 18. The long leg of the hook bolt 15 is threaded for threading engagement in the nut structure.

A clamp bar 22 has the hole 23 through its lower end for receiving the stud 13 and at its upper end has the holes 24 and 25 for receiving the body and hook ends respectively of the hook bolt 15. The hook bolt ends are passed through these holes before the hook bolt is engaged with the nut structure 19.

Clamping pressure producing means is provided which may be in the form of a hand lever structure having a grip end and a cam end. As shown, this lever structure is stamped integral from sheet metal to channel shape and comprises the grip part 26, the cam end portions 27 being provided by extending and properly shaping the side walls of the lever structure. As best shown on Figure 3, the back wall of the lever structure, adjacent to the cam portion, is deflected inwardly to provide a saddle or fulcrum portion 28 and passages 29 and 30 for the upper and lower legs of the hook bolt 15, the saddle or fulcrum portion 28 fitting the bend portion of the bolt to provide a fulcrum engagement for the clamping lever between whose cam portions 27 the bolt legs extend, the cam portions exerting clamping pressure against the clamp bar 22 when the cam lever is swung down.

The guard structure is usually shipped with the hook bolt screwed into the nut structure 19 and with the clamp bar 22 on the hook bolt and the lower stud 13, and with the nut 14 on the stud 13. To assemble the guard structure with the bumper bar, the nut 14 is removed and the lever 26 is swung upwardly to release the cam ends 27 from the clamp bar 22 so that this bar may be swung out clear of the stud 13 and then the lever and the bar may together form a handle structure for screwing the hook bolt into the bolt structure 19 after the guard body has been seated on the bumper bar. The clamp bar is then swung down to receive the stud 13 through its hole 23 and the nut 14 is applied and then the lever 26 is swung down for engagement of its cam ends 27 with the clamp bar. By adjustment of the nut 14 the proper conditions are readily established for the proper tightness of clamp action when the lever 26 is swung down and after the proper adjustment has been accomplished, the lever is again swung up and the end of the stud 13 may be peened over so that the nut 14 cannot be unlawfully readily removed and the guard structure stolen. When the lever 26 is in its lower or clamping position, the cam contact points will have passed through the clamping pressure center line and the lever will be locked in its clamping position and the lower end thereof will receive the nut 14 to form a guard therefor. Should it become necessary to crank the engine or to have access to some other part of the vehicle, the lever 26 is swung upwardly to release the clamp bar 22 for unclamping of the guard structure, which may then be readily shifted laterally along the bumper bar to be out of the way, and it can readily be shifted back into service position and reclamped rigidly in place by downward swing of the cam lever 26.

In the modified arrangement of Figures 4 to 6, instead of using cam means for exerting the clamping pressure, screw means in the form of a nut structure is used and provided with a handle whereby it may be readily turned. The guard body 10 has a lower stud 31 extending outwardly therefrom and threaded at its outer end for receiving a nut 32. An upper bolt or stud 33 is secured to the guard body as by welding its head thereto. The clamping pressure producing nut structure comprises the head 34 having the recess 35, and the tapered base or body 36 which has threaded engagement with the threaded end of the bolt 33. An abutment in the form of a spring ring 37 seated in the circumferential groove 38 in the end of the nut prevents unscrewing of the nut structure from the bolt. The clamp bar 39 has the hole 40 through its upper end for receiving the nut body 36, and the clamp bar at its lower end has the hole 41 therethrough for receiving the lower stud 31.

The operating handle 42 for the clamping nut is of channel shape and formed from sheet metal, and at its upper end has the hole 43 therethrough for receiving the nut head 34. The nut head is cylindrical but at its opposite sides is cut away to provide flat seats 44, the hole 43 in the handle being shaped at its opposite sides to form key portions 45 for engaging the flat surfaces 44, the handle being thus shiftable axially along the nut head but non-rotatable thereon, so that the handle may be used as a wrench for turning the nut structure for clamping of the guard structure to the bumper bar. The flat portions 44 of the nut heads terminate a distance short of the outer end of the head so as to leave abutments 46 engageable by the key portions 45 of the handle thereby to prevent removal of the handle from the nut when the guard structure is assembled. A coil spring 47 encircles the nut head between the handle and the clamp bar 39 and tends to hold the handle against the abutments.

When the guard structure is to be applied to a bumper bar, the nut 32 is removed from the lower stud 31 so that the clamp bar may be swung clear of the stud and the nut 34 is then unscrewed by means of the handle 42 sufficiently to permit the guard body to be seated against the bumper bar. The clamp bar is then reapplied to the stud 31 and also the nut 32, and then the handle 42 is rotated for screwing the nut 34 inwardly into engagement with the clamp bar 39 for clamping of the bumper bar between the clamp bar and the guard body. After adjustment of the nut 32 for the proper clamping engagement, the outer end of the stud 31 may be peened over to prevent removal of the nut. When the handle 42 is in its lower position, it receives and forms a guard for the nut 32, and the spring 47 will hold the handle in this position but will permit the handle to be swung outwardly for unscrewing of the nut 34 when it is desired to release the structure so that it may be shifted along the bumper bar out of the way for cranking or other purposes.

I thus provide a simple guard structure which may be readily clamped in desired service position on a bumper without the use of separate tools and which may be readily sufficiently unclamped so that it may be slid along the bumper bar to be out of the way for cranking or other purposes.

I have shown practical and efficient embodiments of the various features of my invention but I do not desire to be limited to the exact construction and arrangement shown and described, as changes and modifications may be made without departing from the scope of the invention.

I claim as follows:

1. A bumper guard structure comprising a guard body engageable with one side of a bumper bar to extend a distance above and below the bar, upper and lower studs on said guard body for extension beyond the upper and lower edges of the bumper bar, a clamp bar supported by the projecting ends of said studs and adapted for engagement with the other side of the bumper bar, means on said lower stud for holding the clamp bar thereon, clamping pressure producing cam means operable on said upper stud for engagement with said clamp bar to clamp a bumper structure between the clamp bar and the guard body, and a handle on said clamping pressure producing means for operation thereof, said pressure producing means when released permitting shift of the guard structure along the bumper bar to be out of the way for engine cranking or other purposes.

2. A bumper guard structure comprising a guard body engageable with one side of a bumper bar to extend a distance above and below the bar, upper and lower studs on said guard body for extension beyond the upper and lower edges of the bumper bar, a clamp plate apertured to receive said studs for engagement with the other side of the bumper bar, adjusting means on the lower stud for adjusting the position of the clamp bar thereon, clamping pressure producing means carried by said upper stud and operable to exert clamping pressure against the upper end of the clamp bar for clamping the bumper bar between the clamp bar and the guard body, and a handle for said pressure producing means for operation thereof to clamp the guard structure in fixed position or to effect unclamping sufficiently for sliding of the guard structure along the bumper bar, said handle when in clamping position being held in such position by said lower stud and forming a housing for the adjusting member thereon.

3. An automobile bumper guard structure comprising a guard body for engagement with one side of a bumper bar, studs on said guard body extensible therefrom beyond the upper and lower edges of the bumper bar, a clamp bar adjustably fulcrumed on said lower stud and engageable with the other side of the bumper bar, and a cam lever rotatable on said upper stud in a plane at right angles to said clamp bar to exert pressure against said clamp bar for clamping a bumper bar between said clamp bar and the guard body.

4. An automobile bumper guard structure comprising a guard body for engagement with one side of a bumper bar, studs on said guard body extensible therefrom beyond the upper and lower edges of the bumper bar, a clamp bar adjustably fulcrumed on said lower stud and engageable with the other side of the bumper bar, a pressure producing element rotatable on said upper stud to exert pressure against said clamp bar for clamping a bumper bar between said clamp bar and the guard body, and an operating handle extending from said pressure producing element and being recessed to receive and to be held in its clamping position by said lower stud.

5. An automobile bumper guard structure comprising a guard body for engagement with one side of a bumper bar, upper and lower studs anchored to said body for extension above and below the bumper bar, a clamp bar apertured to receive said studs and engageable with the opposite side of the bumper bar, a member adjustable on the outer end of said lower stud forming a fulcrum abutment for said clamping bar, a pressure producing element rotatable on the end of said upper stud for exerting clamping pressure against said clamping bar to clamp the bumper bar between the clamping bar and the guard body, an operating handle extending from said pressure producing element having a recess, and means effective after clamping of the bar to swing said handle for reception in its recess of the adjusting member on said lower stud.

6. A guard structure for automobile bumpers comprising a guard body engageable with one side of a bumper bar, upper and lower studs anchored to said guard body to extend outwardly above and below the bumper bar, a clamping bar confined to and fulcrumed on said lower stud and adapted for engagement with the other side of the bumper bar, a cam element fulcrumed on said upper stud, and a handle extending from said cam element for effecting rotation thereof to exert pressure against the clamping bar for clamping of the bumper bar between the clamping bar and the guard body.

7. A guard structure for automobile bumpers comprising a guard body engageable with one side of a bumper bar, upper and lower studs anchored to said guard body to extend outwardly above and below the bumper bar, a clamping bar confined to and fulcrumed on said lower stud and adapted for engagement with the other side of the bumper bar, a cam element fulcrumed on said upper stud, and a handle extending from said cam element for effecting rotation thereof to exert pressure against the clamping bar for clamping of the bumper bar between the clamping bar and the guard body, said handle after clamping operation thereof receiving and enclosing the end of said lower stud.

8. A guard structure for automobile bumpers comprising a guard body engageable with one side of an automobile bumper bar, a lower stud secured to the guard body to extend below the bumper bar, an upper stud anchored to the guard body to extend above the bumper bar and terminating in its outer end in a hook, a clamping bar engageable with the other side of the bumper bar and apertured to receive said lower stud and to receive said upper stud and the end of the hook thereon, an adjustable fulcrum abutment on said lower stud for said clamping bar, a pressure producing element fulcrumed in the bend of the hook on said upper stud, a handle for said pressure producing element whereby said element may be rotated for pressure engagement with said clamping bar for clamping the bumper bar between said clamping bar and the guard body or for releasing said clamping bar so that said guard structure may be shifted along the bumper bar to be out of the way for cranking of the vehicle engine or other purposes.

9. A guard structure comprising a guard body for engaging with one side of a bumper bar, a lower stud extending from said guard body for projection below the bumper bar, a clamping bar engageable with the other side of the bumper bar, said clamping bar being detachably fulcrumed on said stud, an upper stud having threaded engagement with said guard body for extending above the bumper guard and terminating in its outer end in a hook, said clamping bar being apertured to receive the hook end of the upper stud, said clamping bar when detached from said lower stud serving as a handle for turning of said upper stud for adjustment thereof relative to the guard body, and pressure producing means fulcrumed by said hook and being provided with a handle for turning thereof for exertion of pressure against the clamping bar to clamp the bumper bar between the clamping bar and the guard body.

10. A guard structure comprising a guard body for engagement with one side of a bumper bar, upper and lower studs projecting from said guard body for extension above and below the bumper bar, a clamping bar engageable with the opposite side of said bumper bar and confined to and fulcrumed by said lower stud, a nut structure on said upper stud engageable with said clamping bar to exert clamping pressure for clamping the bumper bar between the clamping bar and the guard body, a handle for the nut structure secured thereto for turning thereof but being free for swing in an axial plane of the nut structure, said handle when swung downwardly receiving the end of said lower stud, and a spring tending to hold said handle in such downwardly swung position.

11. A guard structure comprising a guard body for engaging with one side of a bumper bar, upper and lower studs extending from said body to be above and below the bumper bar, and clamping means locked to said studs against removal therefrom, said clamping means comprising a clamping bar engageable with the other side of the bumper bar and being fulcrumed on the lower stud, and clamping pressure producing means on said upper stud rotatable in a plane at right angles with said clamping bar for engagement with the clamping bar to clamp the bumper bar between the clamping bar and the guard body or for release of the clamping pressure sufficiently for sliding movement of the guard structure along the bumper bar out of the way for cranking of the vehicle engine or for other purposes.

12. An automobile bumper guard structure comprising a guard body for engagement with one side of a bumper bar, upper and lower studs extending from said guard body, a clamp bar apertured to receive said studs and engageable with the other side of the bumper bar, an adjustable fulcrum abutment on the lower stud for said clamp bar, said upper stud having a bent outer end, and a cam lever fulcrumed in said bent outer end for engagement with said clamp bar for clamping of the bumper bar between the clamp bar and the guard body.

13. An automobile bumper guard structure comprising a guard body for engagement with one side of a bumper bar, upper and lower studs extending from said guard body, a clamp bar apertured to receive said studs and engageable with the other side of the bumper bar, an adjustable fulcrum abutment on the lower stud for said clamp bar, said upper stud having a bent outer end, and a cam lever fulcrumed in said bent outer end for engagement with said clamp bar for clamping of the bumper bar between the clamp bar and the guard body, said lever having a recess for receiving and enclosing the abutment member on the lower stud when said lever is in clamping position.

HUGH BUCHANAN.